March 10, 1964
G. S. MAHAN
3,124,042
MULTIPLE SEQUENCE VALVE
Filed Nov. 1, 1961
2 Sheets-Sheet 1
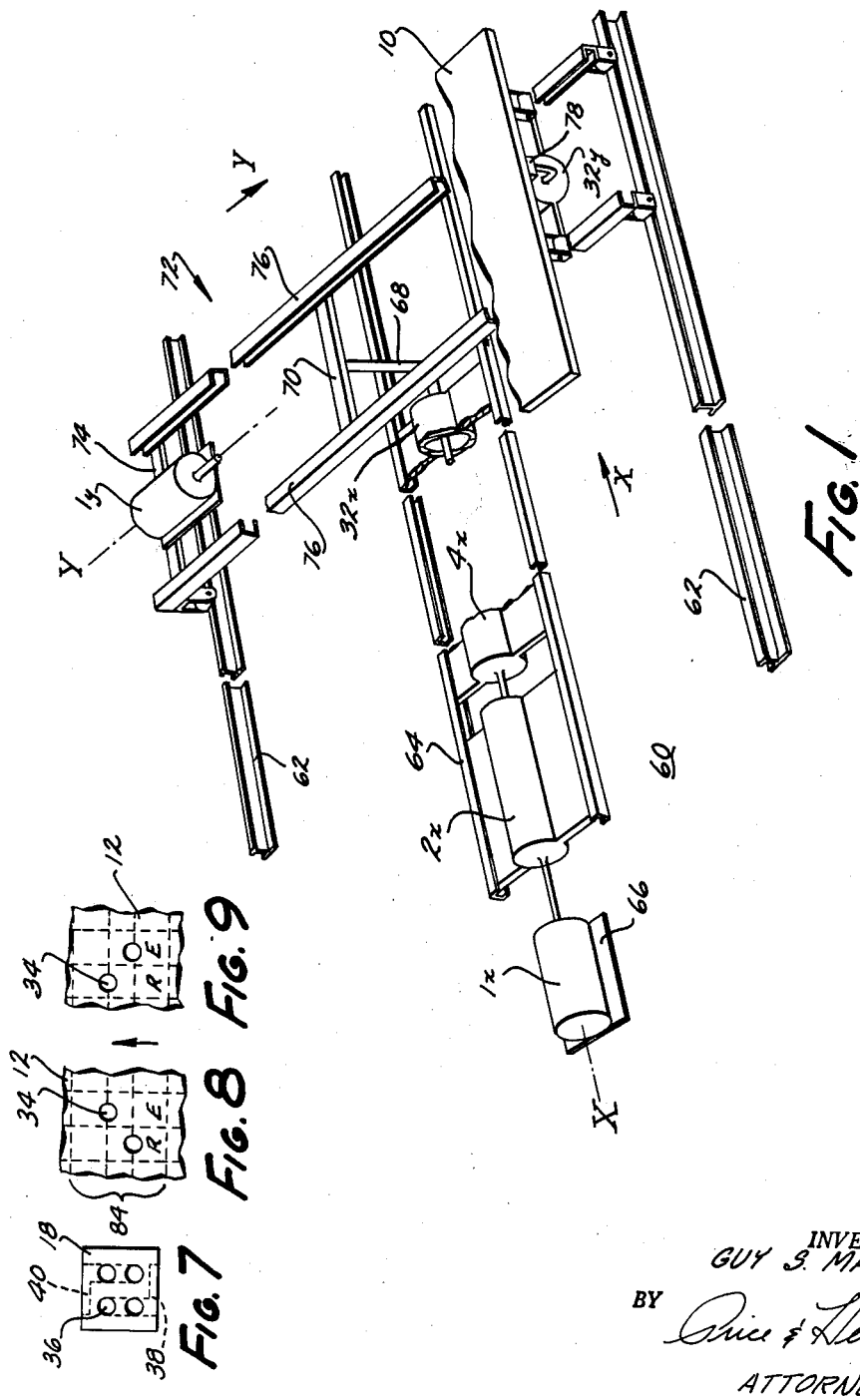
INVENTOR.
GUY S. MAHAN
BY
ATTORNEYS

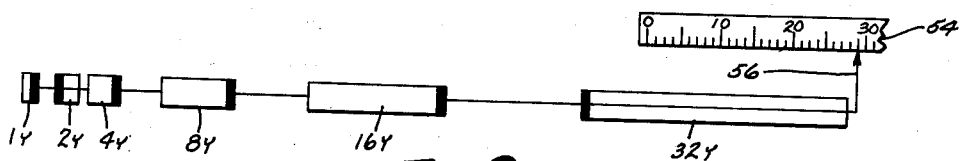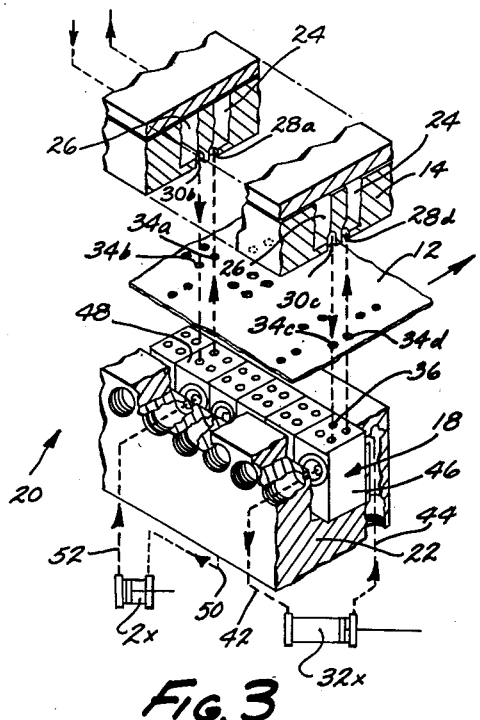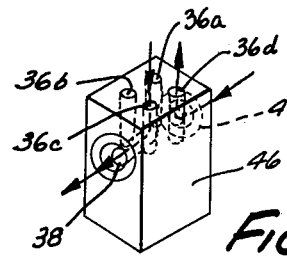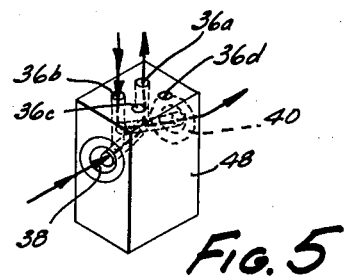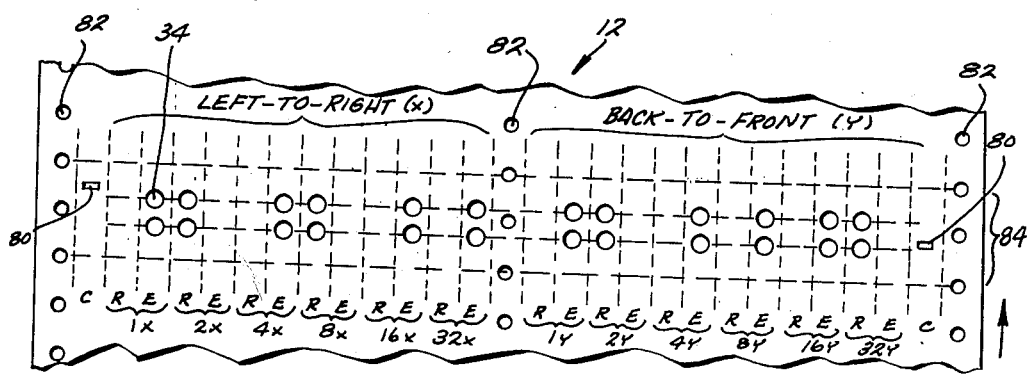

United States Patent Office 3,124,042
Patented Mar. 10, 1964

3,124,042
MULTIPLE SEQUENCE VALVE
Guy S. Mahan, Hudson, Ohio, assignor to International Basic Economy Corporation, New York, N.Y., a corporation of New York
Filed Nov. 1, 1961, Ser. No. 149,394
11 Claims. (Cl. 91—37)

This invention relates to the control of pneumatic devices by punched tape, and more particularly to a programming converter system by which binary numerical information punched on a movable tape can be pneumatically translated into a digital movement of an output element.

Although the principle of this invention has many and varied practical applications, it will be described hereinafter, for purposes of illustration, in connection with the sequential positioning of a work table for the purpose of e.g., performing successive machining operations in different positions on a workpiece.

This type of automation has been done in the past by complex electronic control systems which were not only expensive and delicate, but also required the services of skilled electronics technicians for maintenance and set-up purposes.

The inherent low cost and high accuracy of pneumatic control systems has long made it appear desirable to create a pneumatic converter capable of translating a number system expressed as apertures in a punched tape into successive movements of a machine tool in one or more directions. The described embodiment of the present invention uses a mechanism in which a plurality of pneumatic fluid motors are connected in series in such a manner that the total movement of the output element of the train of fluid motors is equal to the sum of the movements of the individual fluid motors. By making the stroke of each fluid motor twice that of the preceding fluid motor in the train, and by actuating each fluid motor separately in accordance with an "extend" or "retract" signal represented by approxiately located apertures in a punched tape and sensed by an appropriate sensing device, it is possible to move the output element of the fluid motor train to any point within its range of movement according to the length of the stroke increments and the position of the apertures in the tape. Consequently, by incrementally moving the tape, it is possible to sequentially move the output element to various positions in a predetermined sequence to carry out a desired manufacturing operation. The invention itself is concerned with a sensing head structure which translates the aperture pattern of the tape into the physical movement of selected fluid motors into predetermined positions.

It is therefore the object of this invention to provide a sensing head for a pneumatic binary-to-analogue conversion system which establishes predetermined fluid flow paths in response to aperture patterns in a movable tape so as to control the analogue movement of an output element in accordance with binary information expressed in terms of such aperture patterns.

This and other objects of this invention will become apparent from a perusal of the following specification, taken in connection with the accompanying drawings in which:

FIG. 1 is a perspective view of a control mechanism utilizing the principles of the invention for two-dimensional positioning of a work table;

FIG. 2 is a schematic diagram showing the operation of the fluid motor train;

FIG. 3 is an exploded perspective view of the sensing head diagramatically illustrating its operation;

FIG. 4 is a perspective view of a valve block showing the air flow for extension movement of the fluid motor;

FIG. 5 is a perspective view of another valve block similar to the one of FIG. 4, but showing the air flow for the retraction movement of the fluid motor;

FIG. 6 is a fragmentary view of the tape used in the illustrative embodiment, showing the binary command pattern for one position of the work table;

FIG. 7 is a plan view of an alternate type of valve block; and

FIGS. 8 and 9 are aperture patterns for the actuation of the valve block of FIG. 7.

Basically, the invention in its broadest aspect teaches the use of a perforated tape whose perforations establish one of a plurality of flow paths for the pneumatic fluid through a sensing head in such a manner as to selectively actuate certain ones of a plurality of pneumatic devices in a given tape position, the pneumatic devices being operatively interconnected to achieve a result which is the sum total of the individual actuations for that tape position. By moving the tape either continuously or intermittently, the pneumatic devices can be successively actuated in various combinations so as to achieve a predetermined sequence of end results appropriate to carry out a given process.

One possible specific application of the inventive concept is shown in the illustrative embodiment depicted in the drawings. In that embodiment, the end result sought to be achieved is the positioning of the work table 10 (FIG. 1) in accordance with the apertures pattern in tape 12 (FIG. 6). How this result is achieved is shown in FIGS. 1, 2 and 3.

In FIG. 3, a portion of the tape 12 is shown sandwiched between the manifold block 14 and the valve blocks 18 of the sensing head 20. The valve blocks 18 are embedded in a distributor block 22 to which both ends of each of the fluid motors 1x, 2x, 4x, 8x, 16x and 32x are connected. The manifold block 14 has a pair of manifolds 24, 26 extending therethrough in a direction transverse to the direction of movement of the tape 12. The exhaust manifold 24 is connected to a vacuum pump (not shown) or is open to the atmosphere. The pressure manifold 26 is connected to a source of compressed pneumatic fluid (not shown). A plurality of manifold ports 28a, 28d, 30b and 30c extend from the manifolds 24, 26 to the underside of manifold block 14. Each of the manifolds 24, 26 has as many ports 28a and 28d or 30b and 30c, respectively, as there are signal tracks in the tape 12 (signal tracks are the tracks marked "R" or "E" in FIG. 6). Each of the ports 28a, 28d, 30b and 30c overlies one of the signal tracks in such a manner that the apertures 34 in tape 12 can come into register with it.

Underneath the tape 12 as it is drawn through the sensing head are the valve blocks 18, each of which has four valve ports 36 formed therein. Looking now at FIGS. 4 and 5, which show a single valve block 18 in more detail, it will be seen that valve ports 36a and 36c are connected to cross-port 38, whereas valve ports 36b and 36d are connected to cross-port 40. As is schematically indicated by the dotted lines 42, 44 in FIG. 3, cross-port 38 is connected to the left-hand side of a fluid motor such as 32x, and cross-port 40 is connected to the right-hand side of the same cylinder. The tape 12 is so positioned that its forward movement will bring a pair of apertures 34 in an "E" track into register with ports 36c and 36d, whereas a pair of apertures in an "R" track comes into register with ports 36a and 36b. The effect of this arrangement is illustrated in FIGS. 3, 4 and 5. FIG. 4 shows the air passage through valve block 46, whereas FIG. 5 shows the air passage through valve block 48. Specifically, the air passage through block 46 can be traced as follows by the dotted lines: from pressure manifold 26 through manifold port 30c, "E" track aperture 34c, valve block port 36c of valve block 46, cross-port 38, and line 42 to the left end of fluid motor 32x; and from the right end of fluid motor 32x via line 44, cross-port 40 of valve block 46, port 36d, "E" track aperture 34d, and manifold port 28d to the exhaust manifold 24. Similarly, the paths for the block 48 can be traced thus: from pressure manifold 26 through manifold port 30b, "R" track aperture 34b, valve block port 36b of valve block 48, cross-port 40 of valve block 48, and line 50 to the right end of fluid motor 2x; and from the left end of fluid motor 2x through line 52 to cross-port 38 of valve block 48, valve block port 36a, "R" track aperture 34a and manifold port 28a to the exhaust manifold 24. It will be seen that a pair of apertures in the "E" track of tape 12 cause the piston of the fluid motor associated with that track to move to the right, whereas a pair of holes in the "R" track of tape 12 cause the piston in the fluid motor associated therewith to move to the left.

An alternative valve block and tape arrangement is shown in FIGS. 7, 8 and 9. It will be readily seen that the aperture configuration of FIG. 8 causes extension movement of the fluid motor associated with the valve block of FIG. 7, while the aperture configuration of FIG. 9 causes retraction movement thereof.

How this mechanism transforms the binary code of the tape into a digital movement of an output element is diagrammatically shown in FIG. 2, in which the outer end of the piston rod of fluid motor 32y is represented by a pointer 56 and its range of movement by a scale 54. An inspection of FIG. 2 will readily show that the piston of fluid motor 1y has a stroke equal to one length unit of the scale 54; the piston of fluid motor 2y has a stroke of two length units; the piston of fluid motor 4y has a stroke of four length units, and so forth. The housings of fluid motors 2y, 4y, 8y, 16y, and 32y are each tied to the piston of the preceding fluid motor. The housing of fluid motor 1y is fixed; and the piston of fluid motor 32y is tied to the output member 56 which is shown as a pointer indicating the total displacement of the fluid motor train in FIG. 2. Thus, when the piston of fluid motor 1y is moved to the right (i.e. extended) in FIG. 2, the pointer 56 is advanced one unit. If the piston of fluid motor 2y is moved to its rightmost position the pointer 56 is thereby advanced two units; and so forth. The example shown in FIG. 2 shows the pistons of fluid motors 1y, 4y, 8y, and 16y extended, while the pistons of fluid motors 2y and 32y are retracted. If the scale 54 is so arranged that the pointer 56 points at zero when the pistons of all the fluid motors are retracted, the pointer 56 will indicate twenty-nine units on the scale 54 when the pistons are in the positions shown in FIG. 2, twenty-nine being the sum of the stroke units of the extended pistons in FIG. 2 (1+4+8+16=29).

Looking now at FIG. 6, it will be seen that the piston positions indicated in FIG. 2 correspond to the locations of the apertures in the right-hand or "Y" portion of the tape in FIG. 6. Thus, the piston of fluid motor 1y has become extended because the apertures controlling it are located in the "E" (extend) track of the pair of tracks corresponding to fluid motor 1y, and the piston of fluid motor 32y is retracted because the apertures controlling it are located in the "R" (retract) track of the track pair corresponding to fluid motor 32y.

The principles outlined above are used to position the worktable 10 in FIG. 1 in the following manner: the housing of fluid motor 1x is fixedly mounted to a support 66 attached to the bed of the machine 60. The tracks 62 are mounted on the same machine bed, as are channels 64. The fluid motors 2x, 4x, etc. of the "X" train of fluid motors are slidably mounted in the channels 64. The piston of fluid motor 32x carries an arm 68 which is attached to a cross bar 70 of the "Y" train carriage 72. The carriage 72 is adapted to ride back and forth in the x direction on tracks 62. The carriage 72 has a pair of channels 76 which also serve as tracks on which the worktable 10 can roll back and forth in the y direction. The fluid motor 1y is fixedly attached to carriage 72 by cross braces 74. The other fluid motors of the "Y" train are slidably mounted in the channels 76. The piston of the last fluid motor 32y of the "Y" train carries an arm 78 which is attached to the worktable 10. Thus, the position of the worktable 10 at any one time is the geometrical sum of the total stroke of the extended pistons in the "X" train plus the total stroke of the extended pistons in the "Y" train. Since the extension and retraction of individual pistons is controlled by the position of the apertures 34 in the punched tape 12, it will be seen that the aperture arrangement shown in FIG. 6 will displace the worktable 10 fifty-three units in the x direction and twenty-nine units in the y direction.

If the device described herein is used for automatic sequencing of machining operations, control apertures 80 may be provided in each area 84 of tape 12 in control tracks C of tape 12 located just inside the outer ones of sprocket tracks 82. The position of the apertures 80 with respect to the edges of area 84 may control a manufacturing operation by pressure switches in any well-known manner.

It will be seen by the foregoing description that the present invention provides a simple, accurate, and effective method of sequentially translating binary information expressed as apertures in a tape into digital movements of an output member such as, for example, a worktable. Obviously, the control system described herein is applicable to many different uses, and a wide range of modifications may be made in the concept described herein without departing from the invention. It should therefore be understood that the present invention is in no way limited to the embodiment described, but is defined only by the scope of the following claims.

I claim:

1. A fluid-operated device for controlling the movement of a movable output member in accordance with patterns of apertures in a movable tape, comprising: a cylinder; a piston reciprocable within said cylinder, said movable output member being attached to said piston for movement therewith; an intake manifold; means for supplying an operating fluid to said intake manifold; an exhaust manifold; means for exhausting fluid from said exhaust manifold; a fluid passage communicating with said cylinder; and ports connecting said passage with each of said manifolds, fluid flow through said ports being blocked by said tape, whereby said apertures in said tape selectively connect said manifolds and passage in such a manner as to cause said piston to move selectively in two directions.

2. A fluid-operated device for controlling the movement of a movable output member in accordance with patterns of apertures in a movable tape, comprising: a reversible fluid motor; a piston reciprocable within said fluid motor, said movable output member being attached to said piston for movement therewith; a manifold; means for conducting an operating fluid through said manifold; a first fluid passage communicating with one end of said fluid motor; a second fluid passage communicating with the other end of said fluid motor; and ports connecting each of said passages with said manifold, fluid flow through said ports being blocked by said tape, whereby a first pattern of apertures in said tape connects said manifold and passages in such a manner as to cause said piston to move in one direction, and a second pattern in such a manner as to cause said piston to move in the other direction.

3. A fluid-operated device for controlling the movement of a movable output member in accordance with patterns of apertures in a movable tape, comprising: a reversible fluid motor; a piston reciprocable within said fluid motor, said movable output member being attached to said piston for movement therewith; an intake manifold; means for supplying an operating fluid to said intake manifold; an exhaust manifold; means for exhausting fluid from said exhaust manifold; a first fluid passage communicating with one end of said fluid motor; a second fluid passage communicating with the other end of said fluid motor; and ports connecting each of said passages with each of said manifolds, fluid flow through said ports being blocked by said tape, whereby a first pattern of apertures in said tape connects said manifolds and passages in such a manner as to cause said piston to move in one direction, and a second pattern in such a manner as to cause said piston to move in the other direction.

4. A fluid-operated device for controlling the movement of a movable output member, comprising: a movable tape having apertures formed therein in a plurality of patterns; a reversible fluid motor; a piston reciprocable within said fluid motor, said movable output member being attached to said piston for movement therewith; an intake manifold; means for supplying an operating fluid to said intake manifold; an exhaust manifold; means for exhausting fluid from said exhaust manifold; a first fluid passage communicating with one end of said fluid motor; a second fluid passage communicating with the other end of said fluid motor; and two pairs of ports arranged to connect each of said passages with each of said manifolds, fluid flow through said ports being blocked by said tape, and said ports being so arranged that a first pattern of apertures in said tape simultaneously unblocks one of said pairs of ports and a second pattern simultaneously unblocks the other of said pairs of ports, whereby said first pattern of apertures connects said manifolds and passages in such a manner as to cause said piston to move in one direction, and said second pattern in such a manner as to cause said piston to move in the other direction.

5. In a device for controlling the movement of fluid motors in accordance with a pattern of apertures in a movable control tape, a sensing head comprising: a manifold block having a pair of continuous manifolds extending generally parallel to said tape and transversely to its direction of movement, each of said manifolds having a plurality of manifold ports opening onto one side of said tape; at least one valve block having a plurality of pairs of valve ports opening onto the other side of said tape; and a pair of cross-ports spaced from said tape; and a distributor block arranged to hold said valve blocks in alignment with said manifold block, said distributor block having means for operatively connecting said fluid motors to said cross-ports; said valve ports being coaxial with said manifold ports, and one of said pairs of valve ports being connected to one of said cross-ports and another of said pairs to the other of said cross-ports, each of said pairs of valve ports including one valve port coaxial with a manifold port associated with one of said manifolds and one valve port coaxial with a manifold port associated with the other of said manifolds.

6. A device for sequentially positioning a movable portion of a machine tool for a predetermined sequence of operations in accordance with a binary position code expressed as an aperture pattern in a movable tape, comprising: a train of fluid motors fixed at one end and attached to said movable portion at the other, the fluid motors of said train each having a housing and a piston arranged for relative movement independently of the other fluid motors, said cylinders being so interconnected that the total length of said train is a function of the sum of said relative movements, the stroke of each successive one of said pistons being twice the stroke of the preceding piston; a plurality of sensing heads each having a pair of ports connected to each end of one of said fluid motors; a fluid intake manifold; a fluid exhaust manifold; and means for moving a tape between said manifolds and said ports to normally block fluid flow therebetween, said tape having apertures therein, and said ports being so positioned that a first pattern of apertures in said tape connects said intake manifold to one end of said fluid motors and said exhaust manifold to the other, and a second pattern of apertures connects said exhaust manifold to said one end and said intake manifold to the other.

7. In a sensing head for control of a pneumatic fluid motor by aperture patterns in a movable tape, said sensing head having a manifold block with a plurality of pressure manifold ports and a plurality of exhaust manifold ports, the improvement comprising: a valve block having two pairs of valve ports and two cross-ports, each of said pairs of valve ports being connected to one of said cross-ports, and each of said pairs of valve ports including one valve port coaxial with one of said pressure manifold ports and one valve port coaxial with one of said exhaust manifold ports; said tape being movable across said valve ports in such a manner that said aperture patterns can selectively unblock either one of said valve port pairs.

8. A pneumatic control device comprising: a sensing head having a manifold block; a plurality of valve blocks each having a plurality of ports formed therein; means for drawing a tape therebetween, said tape having groups of apertures therein to allow pneumatic communication between manifold ports formed in said manifold block and selected ones of said valve ports formed in said valve blocks; and means connecting said valve ports of each of said valve blocks with a specific fluid motor so as to actuate said fluid motor either one of two directions depending on which ones of said valve ports are in communication with said manifold; said tape being divided into longitudinal tracks each comprising a plurality of transversely extending areas each arranged to pass over a predetermined one of said valve blocks, each of said areas containing a group of apertures adapted for alignment with selected valve and manifold ports for actuating the specific fluid motor connected to the valve ports over which each area passes, the position of said apertures in said areas determining the direction in which each fluid motor is actuated when said area is drawn past said sensing head.

9. The device of claim 8, in which fluid pressure transmitted through a pair of longitudinally aligned apertures in one of a pair of tracks actuates the fluid motor associated therewith in one direction, and fluid pressure transmitted through a pair of longitudinally aligned apertures in the other of said pair of tracks actuates said fluid motor in the opposite direction.

10. The device of claim 8, in which fluid pressure transmitted through an aperture in a given area of said tape in one of a pair of tracks preceding, in the direction of movement of said tape, an aperture in said area in the other of said pair of tracks actuates the fluid motor associated therewith in one direction, and fluid pressure transmitted through an aperture in said one track following an aperture in said other track actuates said fluid motor in the opposite direction.

11. A pneumatic control device operated by a programming tape, comprising: a sensing head having a manifold block having a pair of continuous manifolds extending generally parallel to said tape and transversely to its direction of movement, each of said manifolds having a plurality of manifold ports opening onto one side of said tape; a plurality of valve blocks each having a plurality of pairs of valve ports opening onto the other side of said tape, and a pair of cross-ports spaced from said tape; means for drawing said tape therebetween, said tape having apertures therein to allow pneumatic communication between manifold ports formed in said manifold block and selected ones of the valve ports formed in said valve block; and a distributor block arranged to hold said valve blocks in alignment with said manifold block, said distributor block having means for operatively connecting fluid motors to be controlled to said cross-ports; said valve ports being coaxial with said manifold ports, and one of said pairs of valve ports being connected to one of said cross-ports and another of said pairs of valve ports to the other of said cross-ports, each of said pairs of valve ports including one valve port coaxial with a manifold port associated with one of said manifolds and one valve port coaxial with a manifold port associated with the other of said manifolds; said tape having a pair of longitudinal tracks corresponding to each of said valve blocks and a plurality of transversely extending areas each containing a group of apertures defining a specific manner of actuation of said fluid motors, the position of said apertures with respect to said tracks in each of said areas determining the manner of actuation of said fluid motors to be accomplished when said area is drawn past said sensing head.

References Cited in the file of this patent
UNITED STATES PATENTS

| | | |
|---|---|---|
| 893,280 | Swanson | July 14, 1908 |
| 1,902,064 | Ford | Mar. 21, 1933 |
| 2,734,674 | Ray | Feb. 14, 1956 |
| 2,913,340 | White | Apr. 5, 1960 |